United States Patent
Liu (10) Patent No.: US 11,683,811 B2
(45) Date of Patent: Jun. 20, 2023

(54) RADIO COMMUNICATION METHOD AND DEVICE WITH ALTERABLE TRANSMISSION TIME INTERVAL

(71) Applicant: BEIJING SPREADTRUM HI-TECH COMMUNICATIONS TECHNOLOGY CO., LTD., Beijing (CN)

(72) Inventor: Yang Liu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 1715 days.

(21) Appl. No.: 15/404,767

(22) Filed: Jan. 12, 2017

(65) Prior Publication Data

US 2017/0273103 A1     Sep. 21, 2017

(30) Foreign Application Priority Data

Mar. 15, 2016   (CN) .......................... 201610147380.0

(51) Int. Cl.
  *H04W 48/12*   (2009.01)
  *H04W 72/23*   (2023.01)
      (Continued)

(52) U.S. Cl.
  CPC ....... *H04W 72/23* (2023.01); *H04W 72/1268* (2013.01); *H04W 84/042* (2013.01)

(58) Field of Classification Search
  CPC ......... H04W 72/1289; H04W 72/1268; H04W 48/16; H04W 60/04; H04W 74/0866;
      (Continued)

(56) References Cited

U.S. PATENT DOCUMENTS

| 2013/0223366 A1 | 8/2013 | Papasakellariou et al. |
| 2014/0177487 A1 | 6/2014 | Hammarwall et al. |

(Continued)

FOREIGN PATENT DOCUMENTS

| CN | 104247313 A | 12/2014 |
| CN | 104871627 A | 8/2015 |

OTHER PUBLICATIONS

Summary of the CN First Office Action corresponding to Application No. 201610147380.0; dated May 3, 2018.

*Primary Examiner* — Will W Lin
(74) *Attorney, Agent, or Firm* — Cantor Colburn LLP (57) ABSTRACT

Radio communication method and device with an alterable TTI are provided. The method includes: blindly detecting a primary physical downlink link control channel to acquire first downlink control information which includes configuration information and an exit frame number of a first target TTI; scheduling the first target TTI based on the first downlink control information, and performing data transmission with a base station; and when a frame number of transmitted data exceeds the exit frame number, blindly detecting the primary physical downlink link control channel to schedule a second target TTI indicated by the primary physical downlink link control channel. Solutions in embodiments of the present disclosure may enable to use various TTI simply and efficiently in radio communication, and are particularly adaptive to the feature of TCP service.

16 Claims, 4 Drawing Sheets (51) Int. Cl.
*H04W 72/1268* (2023.01)
*H04W 84/04* (2009.01)

(58) Field of Classification Search
CPC ... H04W 76/10; H04W 84/042; H04W 72/14; H04W 72/23; H04L 27/2676; H04L 1/0038
See application file for complete search history.

(56) References Cited

U.S. PATENT DOCUMENTS

| | | | |
|---|---|---|---|
| 2014/0328260 A1 | 11/2014 | Papasakellarious et al. | |
| 2015/0009953 A1* | 1/2015 | Park | H04W 72/12 370/336 |
| 2015/0312771 A1* | 10/2015 | Li | H04W 24/02 455/446 |
| 2015/0351093 A1 | 12/2015 | Au et al. | |
| 2016/0119920 A1* | 4/2016 | Mallik | H04W 72/0446 370/336 |
| 2016/0338046 A1* | 11/2016 | Chen | H04L 5/0048 |
| 2017/0164272 A1* | 6/2017 | Morioka | H04W 48/16 |
| 2017/0223687 A1* | 8/2017 | Kuchibhotla | H04L 5/0007 |
| 2017/0318564 A1* | 11/2017 | Lee | H04L 5/001 |
| 2018/0110062 A1* | 4/2018 | Byun | H04W 72/1268 |
| 2018/0199322 A1* | 7/2018 | Takeda | H04L 5/0053 |
| 2018/0270852 A1* | 9/2018 | Tabet | H04W 72/23 |
| 2018/0294942 A1* | 10/2018 | Byun | H04L 5/1469 |
| 2018/0317250 A1* | 11/2018 | Yi | H04W 72/0446 |
| 2018/0359068 A1* | 12/2018 | Kim | H04W 8/24 |
| 2018/0367265 A1* | 12/2018 | Wang | H04W 72/542 |
| 2019/0045487 A1* | 2/2019 | You | H04W 72/23 |

* cited by examiner

RADIO COMMUNICATION METHOD AND DEVICE WITH ALTERABLE TRANSMISSION TIME INTERVAL

CROSS-REFERENCE TO RELATED APPLICATIONS

The present application claims priority to Chinese patent application No. 201610147330.0, filed on Mar. 15, 2016, and entitled "RADIO COMMUNICATION METHOD AND DEVICE WITH ALTERABLE TRANSMISSION TIME INTERVAL", and the entire disclosure of which is incorporated herein by reference.

TECHNICAL FIELD

The present disclosure generally relates to radio communication technology, and more particularly, to radio communication method and device with an alterable transmission time interval.

BACKGROUND

Transmission Time Interval (TTI) which determines a scheduling mode of time-frequency resources is an essential parameter in a radio communication system, such as a Long-Term Evolution (LTE) system. A relatively short TTI benefits various radio communication service, however, it also causes some problems, for example, more control overhead of the radio communication system.

Among current radio internet service, Transmission Control Protocol (TCP) based service becomes the most popular one. Most of the TCP service, such as browse of a webpage or play of a short video, has a great data rate and a short life cycle. For TCP, an initial size of a window is relatively small. And the size of the window will not become greatest unless multiple times of round-trip data transmission are performed accurately. Therefore, an activation procedure for TCP is relatively slow. Generally, assuming that a channel is in an ideal state, an activation rate is related to the initial size of the window and a Round-Trip Time (RTT). However, as there are a variety of standards for internet device, the initial size of the window and a threshold of congestion control cannot be too great, which causes RTT to be an essential factor of rapidly promoting the amount of transmitted data for a broadband network.

In radio communication systems, such as the LTE system, it is found that shortening TTI can greatly reduce an air interface delay based on the search on factors that influence the throughput of applications of TCP. However, existing technologies for shortening TTI have many problems, such as being not adaptive to all kinds of User Equipment (UE) or having great costs.

SUMMARY

In embodiments of the present disclosure, radio communication method and device with an alterable TTI are provided, which enables to use various TTI simply and efficiently in radio communication.

In an embodiment of the present disclosure, a radio communication method with an alterable TTI is provided, including: blindly detecting a primary physical downlink link control channel to acquire first downlink control information which includes configuration information and an exit frame number of a first target TTI; scheduling the first target TTI based on the first downlink control information, and performing data transmission with a base station; and when a frame number of transmitted data exceeds the exit frame number, blindly detecting the primary physical downlink link control channel to schedule a second target TTI indicated by the primary physical downlink link control channel.

Optionally, scheduling the first target TTI based on the first downlink control information, and performing data transmission with a base station may include: determining a search area of a secondary physical downlink link control channel based on the configuration information of the first target TTI; detecting second downlink control information on the secondary physical downlink link control channel based on the search area of the secondary physical downlink link control channel; and performing data transmission with the base station based on the second downlink control information in the first target TTI.

Optionally, the second downlink control information may include an exit indicator, and the method may further include: before the frame number of transmitted data exceeds the exit frame number, if the exit indicator is detected to be valid, returning to blindly detect the primary physical downlink link control channel to acquire updated first downlink control information.

Optionally, the secondary physical downlink link control channel may be configured in a first symbol of a frequency resource where the first target TTI is located.

Optionally, the method ay further include: before the frame number of transmitted data exceeds the exit frame number, only detecting the secondary physical downlink link control channel and not blindly detecting the primary physical downlink link control channel.

Optionally, blindly detecting a primary physical downlink link control channel to acquire first downlink control information may include: blindly detecting a search area of the primary physical downlink link control channel; and acquiring the first downlink control information by descrambling target Cell Radio Network Temporary Identify (CRNTI) which is related to the primary physical downlink link control channel.

In an embodiment of the present disclosure, a radio communication device with an alterable TTI is provided, including: a blindly detecting circuitry, configured to blindly detect a primary physical downlink link control channel to acquire first downlink control information which includes configuration information and an exit frame number of a first target TTI; a scheduling and transmitting circuitry, configured to: schedule the first target TTI based on the first downlink control information, and perform data transmission with a base station; and a scheduling controlling circuitry, configured to: when a frame number of transmitted data exceeds the exit frame number, control the blindly detecting circuitry to blindly detect the primary physical downlink link control channel to schedule a second target TTI indicated by the primary physical downlink link control channel.

Optionally, the scheduling and transmitting circuitry may include: a search area determining sub-circuitry, configured to determine a search area of a secondary physical downlink link control channel based on the configuration information of the first target TTI; a detecting sub-circuitry, configured to detect second downlink control information on the secondary physical downlink link control channel based on the search area of the secondary physical downlink link control channel; and a data transmitting sub-circuitry, configured to perform data transmission with the base station based on the second downlink control information in the first target TTI.

Optionally, the second downlink control information may include an exit indicator, and the scheduling controlling circuitry may be further configured to: before the frame number of transmitted data exceeds the exit frame number, if the detecting sub-circuitry detects the exit indicator to be valid, control the blindly detecting circuitry to return to blindly detect the primary physical downlink link control channel to acquire: updated first downlink control information.

Optionally, the secondary physical downlink link control channel may be configured in a first symbol of a frequency resource where the first target TTI is located.

Optionally, before the frame number of transmitted data exceeds the exit frame number, only the detecting sub-circuitry is configured to detect the secondary physical downlink link control channel, and the blindly detecting circuitry is not configured to blindly detect the primary physical downlink link control channel.

Optionally, the blindly detecting circuitry may include: a blindly detecting sub-circuitry, configured to blindly detect a search area of the primary physical downlink link control channel; and a descrambling sub-circuitry, configured to acquire the first downlink control information by descrambling target CRNTI which is related to the primary physical downlink link control channel.

Embodiments of the present disclosure may provide following advantages. The base station indicates the configuration information and the exit frame number of the first target TTI in the primary physical downlink link control channel. After blindly detecting the primary physical downlink link control channel, the UE can schedule the first target TTI to transmit data with the base station based on the configuration information of the first target TTI. When the frame number of transmitted data exceeds the exit frame number, the UE blindly detects the primary physical downlink link control channel again to schedule the second target TTI. From above, TTI is shortened partially in a simple way, that is, different TTIs are used at different times, so as to adapt various UEs.

Further, the UE determines the search area of the secondary physical downlink link control channel based on the configuration information of the first target TTI, and further detects the second downlink control information on the secondary physical downlink link control channel, based on which the data transmission with the base station is performed. In other words, only the secondary physical downlink link control channel is detected during data transmission, while it is unnecessary to detect the primary physical downlink link control channel all the time, so that extra system costs are controlled effectively.

Further, before the frame number of transmitted data reaches the exit frame number, the base station may configure new configuration information of the first target TTI on the primary physical downlink link control channel, and indicate the UE to blindly detect the primary physical downlink link control channel again through the secondary physical downlink link control channel. In this way, the UE exits the first target TTI and schedules the second target TTI which may be the same as or different from the first target TTI.

DETAILED DESCRIPTION

As described in the background, existing technologies for shortening TTI have many problems, such as being not adaptive to all kinds of UE or having great costs.

In embodiments of the present disclosure, the base station indicates the configuration information and the exit frame number of the first target TTI in the primary physical downlink link control channel. After blindly detecting the primary physical downlink link control channel, the UE can schedule the first target TTI to transmit data with the base station based on the configuration information of the first target TTI. When the frame number of transmitted data exceeds the exit frame number, the UE blindly detects the primary physical downlink link control channel again to schedule the second target TTI. From above, TTI is shortened partially in a simple way, that is, different TTIs are used at different times, so as to adapt various UEs. Solutions in embodiments of the present disclosure may be particularly adaptive to the feature of TCP service, and may control extra resource costs caused by using different TTIs, thus, radio resources may be saved.

Further, the UE determines the search area of the secondary physical downlink link control channel based on the configuration information of the first target TTI, and further detects the second downlink control information on the secondary physical downlink link control channel, based on which the data transmission with the base station is performed. In other words, only the secondary physical downlink link control channel is detected during data transmission, while it is unnecessary to detect the primary physical downlink link control channel all the time, so that extra system costs are controlled effectively.

Further, before the frame number of transmitted data reaches the exit frame number, the base station may configure new configuration information of the first target TTI on the primary physical downlink link control channel, and indicate the UE to blindly detect the primary physical downlink link control channel again through the secondary physical downlink link control channel. In this way, the UE exits the first target TTI and schedules the second target TTI which may be the same as or different from the first target TTI.

In order to clarify the object, solutions and advantages of embodiments of the present disclosure, embodiments of present disclosure will be described clearly in detail in conjunction with accompanying drawings.

Figure 1:
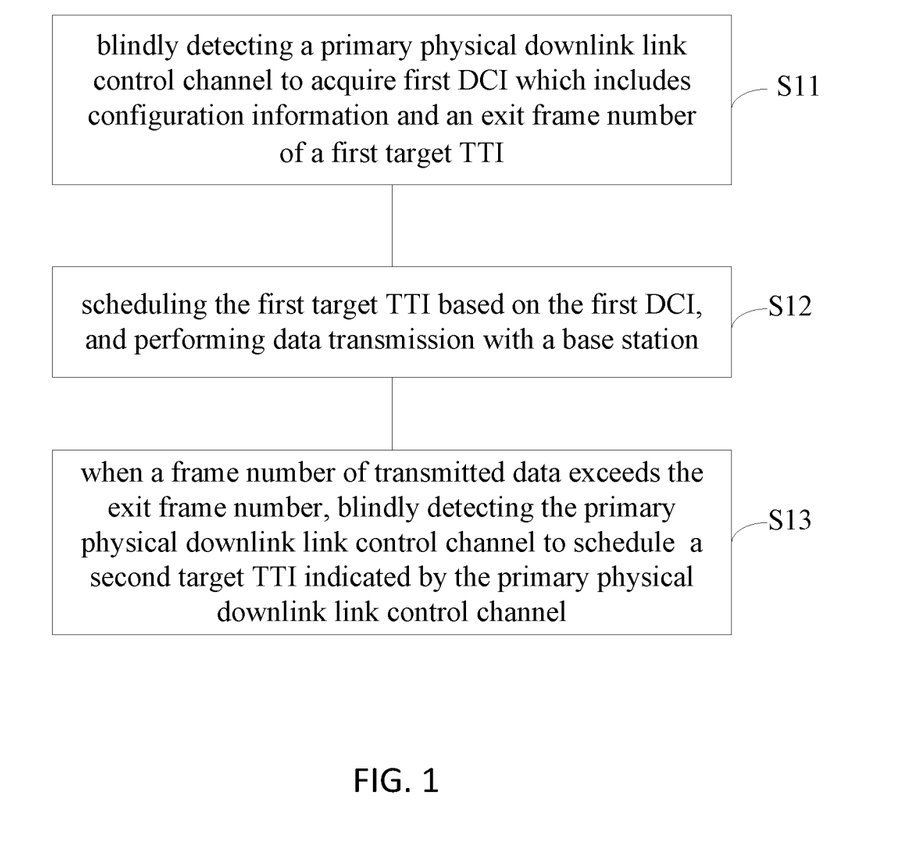
FIG. 1 schematically illustrates a flow chart of a radio communication method with an alterable TTI according to an embodiment.

A radio communication method with an alterable TTI provided in an embodiment may be applied in an LTE system or other suitable radio communication systems. Referring to FIG. 1, the method may include:

S11, blindly detecting a primary physical downlink link control channel to acquire first downlink control information (DCI) which includes configuration information and an exit frame number of a first target TTI;

S12, scheduling the first target TTI based on the first DCI, and performing data transmission with a base station; and S13, when a frame number of transmitted data exceeds the exit frame number, blindly detecting the primary physical downlink link control channel to schedule a second target TTI indicated by the primary physical downlink link control channel.

Hereinafter, the method is described in detail by taking an LTE system as an example. The primary physical downlink link control channel and a secondary physical downlink link control channel are called a primary sPDCCH and a secondary sPDCCH, respectively, to differ from a Physical Downlink Control Channel (PDCCH) in the LTE system. A target TTI denotes to a TTI to be employed that is indicated by the primary sPDCCH, which is also called sTTI, to differ from a default TTI (i.e., 1 ms) in the LTE system. In some embodiments, sTTI is less than 1 ms, for example, 0.5 ms or 0.25 ms. In some embodiments, sTTI is greater than 1 ms, for example, 2 ms, to meet some requirements.

In some embodiments, to blindly detect the primary sPDCCH to acquire the first DCI, CRNTI dedicated for the primary sPDCCH is defined and also called a target CRNTI or sCRNTI. And the target CRNTI is used to blindly detect the sPDCCH. As sCRNTI matches the primary sPDCCH, the first DCI carried on the primary sPDCCH can be obtained by descrambling sCRNTI. In some embodiments, sCRNTI may be predetermined through protocols or other ways in a radio communication system. For example, the system may allocate a sCRNTI for the primary sPDCCH, so that the UE can use the sCRNTI to blindly detect the primary sPDCCH.

DCI for each TTI is located in a predetermined area, i.e., a search area. Therefore, the search area may be determined according to TTI. In some embodiments, the search area of the primary sPDCCH may be determined based on a default TTI, for example, using a search area and resources of a common PDCCH in the current LTE system. In other words, to the accessed UE, a search area of the PDCCH in the current LTE system may be blindly detected, and sCRNTI may be descrambled to obtain the first DCI carried in the sPDCCH.

In some embodiments, the first DCI may include configuration information (such as length of sTTI, for example, 0.5 ms or 0.25 ms) and an exit frame number of sTTI. In some embodiments, the first DCI may further include time-frequency resource configuration and other control information. The exit frame number is used to indicate the UE to remain a current sTTI unchanged within the exit frame number, and to blindly detect the primary sPDCCH again to acquire configuration information of a new sTTI when the exit frame number is exceeded. Therefore, the UE does not need to blindly detect the primary sPDCCH all the time, which may reduce system costs.

In some embodiments, the UE may determine the search area of sTTI according to the length of sTTI, and further detect second DCI on the secondary sPDCCH in the search area of sTTI. The secondary sPDCCH may be configured in a first symbol of a time-frequency resource where sTTI is located (i.e., time-frequency information). The second DCI includes configuration information for controlling data transmission, such as at least a portion of DCI on the PDCCH in the current LTE system. Afterwards, the UE can schedule resources in the sTTI, and performs data transmission with the base station. During the data transmission, the UE only detects the secondary sPDCCH, and does not need to blindly detect the primary sPDCCH.

When the frame number of transmitted data exceeds the exit frame number, the UE returns to blindly detect the primary sPDCCH, and acquires new first DCI carried by the primary sPDCCH currently which includes new sTTI and a new exit frame number. In some embodiments, the new sTTI may be the default TTI in the LTE system, i.e., 1 ms, or other TTI. In some embodiments, the new sTTI may be the same as the current sTTI. That is, the UE still keeps the current sTTI and does not determine another new sTTI, until the current sTTI is exceeded again.

In some embodiments, the secondary sPDCCH may carry an exit indicator, that is, the second DCI may include an exit indicator for indicating whether the UE needs to blindly detect the primary sPDCCH. If the exit indicator is detected to be valid, for example, a binary bit corresponding to the exit indicator is 0, the UE does not need to wait for the end of the exit frame number and starts to blindly detect the primary sPDCCH, to acquire updated first DCI and schedule the new sTTI according to the updated first DCI. If the exit indicator is detected to be invalid, for example, a binary bit corresponding to the exit indicator is 1, the detection to the secondary sPDCCH is continued, and the primary sPDCCH is not blindly detected.

By the above embodiments, the UE is scheduled to a relatively short sTTI (less than 1 ms), and a duration of the sTTI depends on the exit frame number, so that a semi-static TTI scheduling mode is realized. Alternatively, other sTTI or a common TTI in the LTE system may be employed according to indication from the base station, so as to realize a more flexible TTI scheduling mode. Solutions in the above embodiments are particularly adaptive to the feature of slow activation of TCP.

In some embodiments, resources capable of being scheduled in each sTTI may be different, for example, from 1 Orthogonal Frequency-Division Multiplexing (OFDM) symbols to 7 OFDM symbols.

Besides, those skilled in the art should understand that, to realize the solutions in the embodiments of the present disclosure, signaling information configured in the PDCCH including the configuration information and/or the exit frame number of the primary and secondary sPDCCHs may be developed in a high-layer configuration message in the LTE system. Accordingly, Physical Hybrid ARQ Indicator Channel (PHICH), and uplink and downlink reference signals in the sTTI may be also adjusted and developed according to the configuration information of the sTTI. An uplink control channel may be strengthened according to the configuration information of the sTTI to adapt uplink data in the sTTI.

Figure 2:
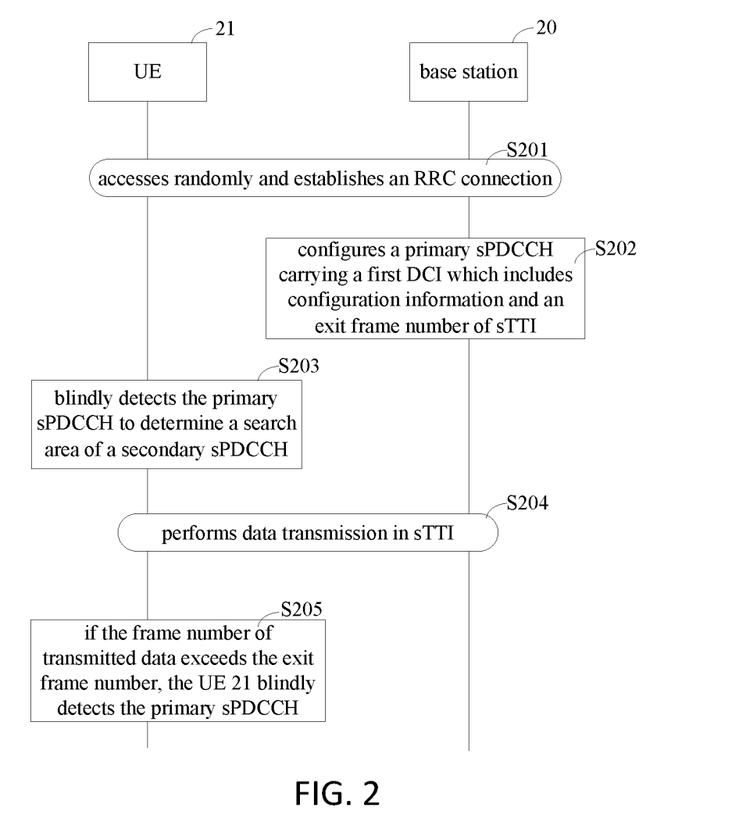
FIG. 2 schematically illustrates a data flow diagram of a radio communication method with an alterable TTI according to an embodiment.

Referring to FIG. 2, FIG. 2 schematically illustrates a data flow diagram of a radio communication method with an alterable according to an embodiment.

In S201, a UE 21 accesses randomly and establishes a Radio Resource Control (RRC) connection with a base station 20.

In S202, the base station 20 configures a primary sPDCCH carrying a first DCI which includes configuration information (for example, length of sTTI) and an exit frame number of sTTI.

In S203, the UE 21 blindly detects the primary sPDCCH. In some embodiments, the UE uses a search area of a common PDCCH in a current LTE system to blindly detect the primary sPDCCH, and descrambles sCRNTI related to the primary sPDCCH to obtain first DCI. A search area of a secondary sPDCCH is determined based on the first DCI, and further the UE may schedule sTTI based on second DCI carried in the secondary sPDCCH.

In S204, the UE 21 performs data transmission with the base station 20 in sTTI. Before the frame number of transmitted data reaches the exit frame number, the UE 21 only detects the secondary sPDCCH and does not need to blindly detect the primary sPDCCH.

In S205, when detecting that the frame number of transmitted data exceeds the exit frame number, the UE 21 blindly detects the primary sPDCCH again. In some embodiments, the UE 21 may acquire updated first DCI by descrambling sCRNTI. The updated first DCI carries new sTTI and a new exit frame number. Therefore, the UE 21 may schedule the new sTTI to perform data transmission based on the updated first DCI.

Figure 3:
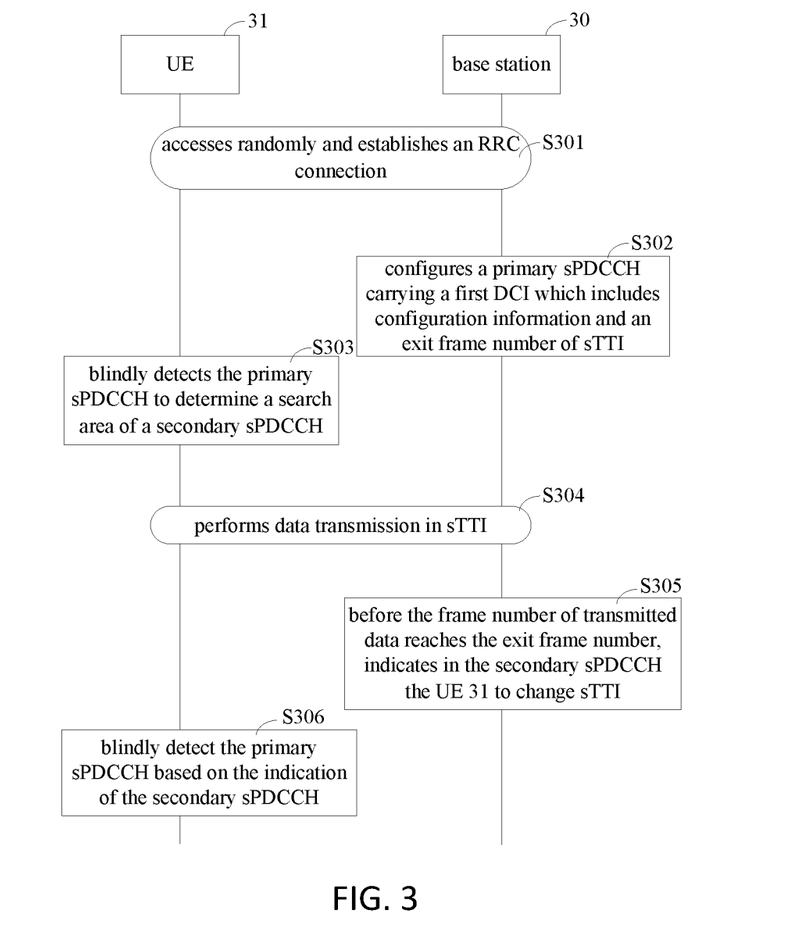
FIG. 3 schematically illustrates a data flow diagram of a radio communication method with an alterable TTI according to another embodiment.

Referring to FIG. 3, FIG. 3 schematically illustrates a data flow diagram of a radio communication method with an alterable TTI according to another embodiment.

In S301, a UE 31 accesses randomly and establishes an RRC connection with a base station 30.

In S302, the base station 30 configures a primary sPDCCH carrying a first DCI which includes configuration information (for example, length of sTTI) and an exit frame number of sTTI.

In S303, the UE 31 blindly detects the primary sPDCCH. In some embodiments, the UE uses a search area of a common PDCCH in a current LTE system to blindly detect the primary sPDCCH, and descrambles sCRNTI related to the primary sPDCCH to obtain first DCI. A search area of a secondary sPDCCH is determined based on the first DCI, and further the UE may schedule sTTI based on second DCI carried in the secondary sPDCCH.

In S304, the UE 31 performs data transmission with the base station 30 in sTTI. Before the frame number of transmitted data reaches the exit frame number, the UE 31 only detects the secondary sPDCCH and does not need to blindly detect the primary sPDCCH.

In S305, before the frame number of transmitted data reaches the exit frame number, the base station 30 indicates in the secondary sPDCCH the UE 31 to change sTTI. For example, the base station 30 may set an exit indicator in the secondary sPDCCH to be valid.

In S306, the UE 31 starts to blindly detect the primary sPDCCH at the beginning of a next sub-frame, based on the indication of the secondary sPDCCH.

In some embodiments, the UE 31 may acquire updated first DCI by descrambling sCRNTI. The updated first DCI carries new sTTI and a new exit frame number. Therefore, the UE 31 may schedule the new sTTI to perform data transmission based on the updated first DCI.

Figure 4:
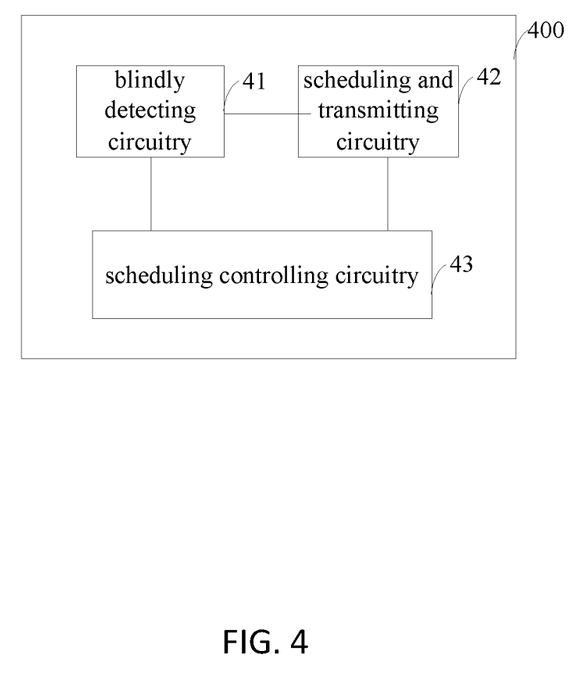
FIG. 4 schematically illustrates a structural diagram of a radio communication device with an alterable TTI according to an embodiment.

Referring to FIG. 4, FIG. 4 schematically illustrates a structural diagram of a radio communication device 400 with an alterable TTI according to an embodiment. The radio communication device 400 includes: a blindly detecting circuitry 41, configured to blindly detect a primary physical downlink link control channel to acquire first downlink control information which includes configuration information and an exit frame number of a first target TTI; a scheduling and transmitting circuitry 42, configured to: schedule the first target TTI based on the first downlink control information, and perform data transmission with a base station; and a scheduling controlling circuitry 43, configured to: when a frame number of transmitted data exceeds the exit frame number, control the blindly detecting circuitry 41 to blindly detect the primary physical downlink link control channel to schedule a second target TTI indicated by the primary physical downlink link control channel.

In some embodiments, the blindly detecting circuitry 41 may include: a blindly detecting sub-circuitry, configured to blindly detect a search domain of the primary physical downlink link control channel; and a descrambling sub-circuitry, configured to acquire the first downlink control information by descrambling target CRNTI which is related to the primary physical downlink link control channel.

In some embodiments, the scheduling and transmitting circuitry 42 may include: a search domain determining sub-circuitry, configured to determine a search domain of a secondary physical downlink link control channel based on the configuration information of the first target TTI; a detecting sub-circuitry, configured to detect second downlink control information on the secondary physical downlink link control channel based on the search domain of the secondary physical downlink link control channel; and a data transmitting sub-circuitry, configured to perform data transmission with the base station based on the second downlink control information in the first target TTI.

More details of the radio communication device 400 can be found in above description about embodiments of the radio communication method, and are not described in detail here.

In some embodiments, the radio communication device 400 may be used in a UE, and realized by software, hardware or the combination thereof. The radio communication device 400 may be integrated in the UE or coupled with the UE externally.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A radio communication method with an alterable Transmission Time Interval (TTI), comprising:
    blindly detecting a primary physical downlink link control channel to acquire first downlink control information which comprises configuration information of a first target TTI and an exit frame number;
    scheduling the first target TTI based on the first downlink control information, and performing data transmission with a base station; and
    when a frame number of transmitted data exceeds the exit frame number, blindly detecting the primary physical downlink link control channel to schedule a second target TTI indicated by the primary physical downlink link control channel.

2. The method according to claim 1, wherein scheduling the first target TTI based on the first downlink control information, and performing data transmission with a base station comprises:
    determining a search area of a secondary physical downlink link control channel based on the configuration information of the first target TTI;
    detecting second downlink control information on the secondary physical downlink link control channel based on the search area of the secondary physical downlink link control channel; and performing data transmission with the base station based on the second downlink control information in the first target TTI.

3. The method according to claim 2, wherein the second downlink control information comprises an exit indicator, and the method further comprises: before the frame number of transmitted data exceeds the exit frame number, if the exit indicator is detected to be valid, returning to blindly detect the primary physical downlink link control channel to acquire updated first downlink control information.

4. The method according to claim 2, wherein the secondary physical downlink link control channel is configured in a first symbol of a frequency resource where the first target TTI is located.

5. The method according to claim 2, further comprising: before the frame number of transmitted data exceeds the exit frame number, only detecting the secondary physical downlink link control channel and not blindly detecting the primary physical downlink link control channel.

6. The method according to claim 1, wherein blindly detecting a primary physical downlink link control channel to acquire first downlink control information comprises:
blindly detecting a search area of the primary physical downlink link control channel; and
acquiring the first downlink control information by descrambling target Cell Radio Network Temporary Identify (CRNTI) which is related to the primary physical downlink link control channel.

7. The method according to claim 1, wherein the first target TTI and the second target TTI are different or the same in length.

8. The method according to claim 1, wherein the configuration information of the first target TTI comprises a length of the first target TTI, and the exit frame number is used to indicate the UE to remain the first target TTI unchanged within the exit frame number.

9. A radio communication device with an alterable Transmission Time Interval (TTI), comprising:
a blindly detecting circuitry, configured to blindly detect a primary physical downlink link control channel to acquire first downlink control information which comprises configuration information of a first target TTI and an exit frame number;
a scheduling and transmitting circuitry, configured to: schedule the first target TTI based on the first downlink control information, and perform data transmission with a base station; and
a scheduling controlling circuitry, configured to: when a frame number of transmitted data exceeds the exit frame number, control the blindly detecting circuitry to blindly detect the primary physical downlink link control channel to schedule a second target TTI indicated by the primary physical downlink link control channel.

10. The device according to claim 9, wherein the scheduling and transmitting circuitry comprises:
a search area determining sub-circuitry, configured to determine a search area of a secondary physical downlink link control channel based on the configuration information of the first target TTI;
a detecting sub-circuitry, configured to detect second downlink control information on the secondary physical downlink link control channel based on the search area of the secondary physical downlink link control channel; and
a data transmitting sub-circuitry, configured to perform data transmission with the base station based on the second downlink control information in the first target TTI.

11. The device according to claim 10, wherein the second downlink control information comprises an exit indicator, and the scheduling controlling circuitry is further configured to: before the frame number of transmitted data exceeds the exit frame number, if the detecting sub-circuitry detects the exit indicator to be valid, control the blindly detecting circuitry to return to blindly detect the primary physical downlink link control channel to acquire updated first downlink control information.

12. The device according to claim 10, wherein the secondary physical downlink link control channel is configured in a first symbol of a frequency resource where the first target TTI is located.

13. The device according to claim 10, wherein before the frame number of transmitted data exceeds the exit frame number, the detecting sub-circuitry is configured to detect the secondary physical downlink link control channel, and the blindly detecting circuitry is not configured to blindly detect the primary physical downlink link control channel.

14. The device according to claim 9, wherein the blindly detecting circuitry comprises:
a blindly detecting sub-circuitry, configured to blindly detect a search area of the primary physical downlink link control channel; and
a descrambling sub-circuitry, configured to acquire the first downlink control information by descrambling target Cell Radio Network Temporary Identify (CRNTI) which is related to the primary physical downlink link control channel.

15. The device according to claim 9, wherein the first target TTI and the second target TTI are different or the same in length.

16. The device according to claim 9, wherein the configuration information of the first target TTI comprises a length of the first target TTI, and the exit frame number is used to indicate the UE to remain the first target TTI unchanged within the exit frame number.

* * * * *